United States Patent [19]
Moon

[11] Patent Number: 6,133,967
[45] Date of Patent: Oct. 17, 2000

[54] METHOD OF FABRICATING LIQUID CRYSTAL DISPLAY WITH INCREASED APERTURE RATIO

[75] Inventor: Dae-Gyu Moon, Kyungki-do, Rep. of Korea

[73] Assignee: LG Electronics, Inc., Seoul, Rep. of Korea

[21] Appl. No.: 09/282,162

[22] Filed: Mar. 31, 1999

Related U.S. Application Data

[62] Division of application No. 08/712,316, Sep. 11, 1996, Pat. No. 5,942,310.

[30] Foreign Application Priority Data

Sep. 12, 1995 [KR] Rep. of Korea ............... 95/029678

[51] Int. Cl.[7] ............................................. G02F 1/1343
[52] U.S. Cl. ............................ 349/39; 349/43; 349/42
[58] Field of Search ............................ 349/47, 46, 43, 349/42, 38, 39

[56] References Cited

U.S. PATENT DOCUMENTS

| | | | |
|---|---|---|---|
| 5,054,887 | 10/1991 | Kato et al. | 359/59 |
| 5,182,620 | 1/1993 | Shimada et al. | 257/72 |
| 5,182,661 | 1/1993 | Ikeda et al. | 359/54 |
| 5,341,012 | 8/1994 | Misawa et al. | 257/351 |
| 5,474,942 | 12/1995 | Kodaira et al. | 437/21 |
| 5,483,082 | 1/1996 | Takizawa et al. | 257/59 |
| 5,573,959 | 11/1996 | Kodaira et al. | 437/21 |
| 5,576,858 | 11/1996 | Ukai et al. | 359/59 |
| 5,580,796 | 12/1996 | Takizawa et al. | 437/21 |
| 5,648,663 | 7/1997 | Kitahara et al. | 257/59 |
| 5,650,637 | 7/1997 | Kodaira et al. | 257/72 |
| 5,677,547 | 10/1997 | Kodaira et al. | 257/59 |
| 5,686,326 | 11/1997 | Kitahara et al. | 437/40 |
| 5,691,793 | 11/1997 | Watanbe et al. | 349/155 |
| 5,742,363 | 4/1998 | Bae | 349/38 |

*Primary Examiner*—James A. Dudek
*Attorney, Agent, or Firm*—Morgan, Lewis & Bockius LLP

[57] ABSTRACT

A liquid crystal display includes a thin film transistor and a storage capacitor. The thin film transistor includes an active layer formed over a substrate, source and drain regions formed of a impurity-doped semiconductor layer on both sides of the active layer, a gate electrode, and a gate insulating layer formed between the gate electrode and the active layer. The storage capacitor includes a first storage electrode formed over the substrate, a dielectric layer formed over the first storage electrode, and a second storage electrode formed over the dielectric layer. One of the first and second storage electrodes is connected to one of the source and drain regions, and the gate insulating layer and the dielectric layer are formed in different steps or layers.

19 Claims, 6 Drawing Sheets

METHOD OF FABRICATING LIQUID CRYSTAL DISPLAY WITH INCREASED APERTURE RATIO

This is a divisional application Ser. No. 08/712,316, filed on Sep. 11, 1996, now U.S. Pat. No. 5,942,310.

BACKGROUND OF THE INVENTION

1. Field of the Invention

The present invention relates to a liquid crystal display (LCD) and a method for fabricating the same, and more particularly, to a thin film transistor (TFT) liquid crystal display (LCD) and a method for fabricating the same.

2. Discussion of the Related Art

In order to reduce the power consumption of a TFT LCD, it is necessary to increase the aperture ratio of the TFT LCD. An aperture ratio of TFT LCD is defined as a ratio of the area in which display actually occurs to the entire area of the LCD panel. In most cases, a TFT LCD has a storage capacitor connected to the drain electrode of the TFT. The storage capacitor is typically constructed by an opaque film. Therefore, the area occupied by the storage capacitor is not used for display for a light-transmitting type LCD. Also, metal signal lines are typically formed of a non-transparent material. Thus, one way to increase the aperture ratio for LCD is to reduce the area occupied by the storage capacitor and/or the metal signal lines.

Figure 1A:
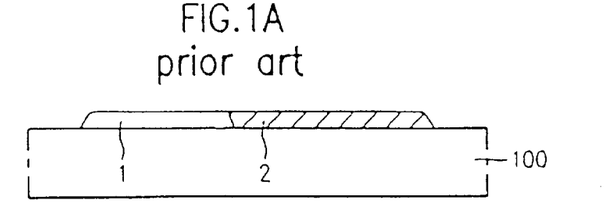
FIGS. 1A to 1E are cross-sectional views showing a conventional method for fabricating a TFT for LCD.
Figure 1B:
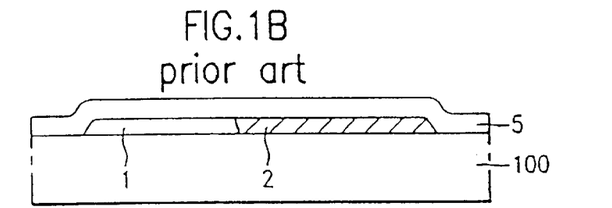
Figure 1C:
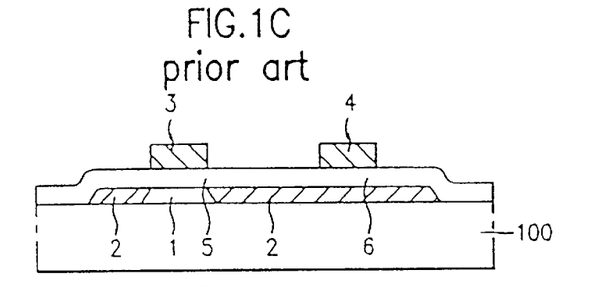

A method for fabricating a conventional TFT for a TFT LCD having a storage capacitor will be explained below with reference to FIGS. 1A to 1E. As shown in FIG. 1A, a semiconductor layer is deposited on a transparent insulating substrate 100, and patterned to form an active layer 1. Impurities are doped into a predetermined portion of the active layer 1 to form an impurity-doped semiconductor layer 2. Then, as shown in FIG. 1B, an insulating layer 5 is formed on the overall surface of the substrate 100 including the active layer 1 and the impurity-doped layer 2. A conductive layer, such as a doped polysilicon layer or a silicide layer, is formed on the insulating layer 5 and patterned to form a gate electrode 3 and a storage electrode 4. Impurities are ion-implanted into a portion of the active layer 1 to form source and drain regions, which are indicated by a new portion of the impurity-doped semiconductor layer 2 shown in FIG. 1C. Here, a portion of the insulating layer located below the gate electrode 3 serves as a gate insulating layer 5 for the TFT. The other portion of the insulating layer located below the storage electrode 4 serves as a dielectric layer 6 for a storage capacitor. In other words, the gate insulating layer 5 and the dielectric layer 6 are formed in the same step. Accordingly, they have the same thickness and dielectric constants.

Figure 1D:
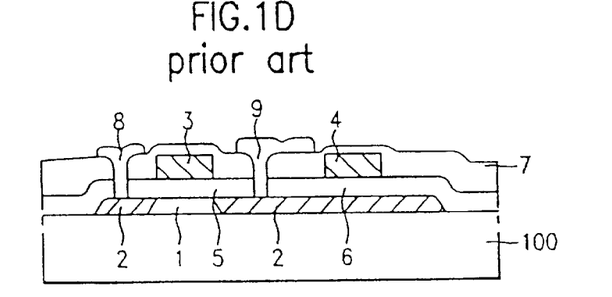
Figure 1E:
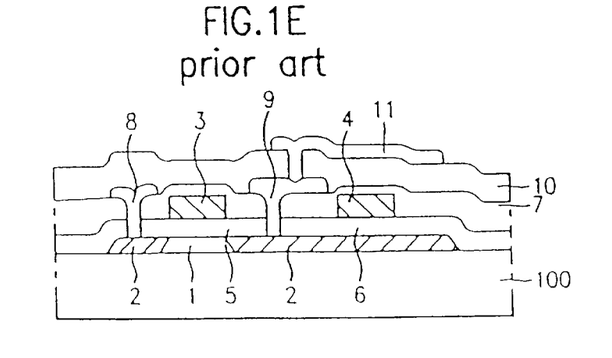

As shown in FIG. 1D, an interlayer insulating layer 7 is formed on the overall surface of the substrate. The interlayer insulating layer 7 and the dielectric layer 6 and/or the gate insulating layer 5 are selectively etched to form contact holes exposing a portion of the impurity-doped semiconductor layer 2. Then, a conductive layer is formed on the overall surface of the substrate and patterned to form a source electrode 8 and a drain electrode 9, which are connected to the impurity-doped semiconductor layer 2 through the contact holes. As shown in FIG. 1E, a passivation layer 10 is formed on the overall surface of the substrate, and selectively etched to form a contact hole which exposes a portion of the drain electrode 9. Then, a transparent conductive layer is formed on the passivation layer 10 and patterned to form a pixel electrode 11. The pixel electrode 11 is connected to the drain electrode 9 through the contact hole, thereby completing a thin film transistor having a storage capacitor.

As described above, one way to increase the aperture ratio of TFT LCD is to reduce the area occupied by the storage capacitor. In order to reduce the area of the capacitor without sacrificing the capacitance, the dielectric layer 6 needs to be made thinner, or formed of a material having a dielectric constant larger. However, in the conventional method, since the gate insulating layer and dielectric layer are formed of the same layer, they have the same thickness and dielectric constants. Accordingly, only a limited adjustment of the thickness has been possible. Also, it has been impossible to form the dielectric layer 6 using a material having a dielectric constant larger than that of the gate insulating layer.

SUMMARY OF THE INVENTION

Accordingly, the present invention is directed to a liquid crystal display that substantially obviates one or more of the problems due to limitations and disadvantages of the related art.

An object of the present invention is to provide a thin film transistor liquid crystal display and a method for fabricating the same that improve the numerical aperture of an LCD.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the liquid crystal display includes a plurality of gate lines, a plurality of data lines in intersection with the plurality of gate lines, a plurality of thin film transistors consisting of gate insulating layers and gate electrodes formed at the respective intersections of the gate lines and data lines, channel regions, and source and drain electrodes, pixel electrodes connected to the respective drain electrodes of the respective thin film transistors, and a dielectric layer formed between the pixel electrodes and storage electrodes, in which the thickness of the gate insulating layer and the dielectric layer placed between the pixel electrode and the storage electrode are different from each other.

In another aspect, the method for fabricating a liquid crystal display includes the steps of forming a semiconductor layer on a transparent insulating substrate, forming a gate insulating layer on the transparent insulating substrate and the semiconductor layer, forming a gate electrode on the gate insulating layer, selectively etching the gate insulating layer to be left under the gate electrode, forming a dielectric layer for storage capacitance on the transparent substrate, and forming a storage electrode on the dielectric layer.

In a further aspect, the method for fabricating a liquid crystal display comprises the steps of forming an active layer on a transparent insulating substrate, forming an impurity-doped layer in a portion of the active layer, forming a gate insulating layer on the overall surface of the substrate on which the active layer is formed, forming a gate electrode on the gate insulating layer, selectively etching the gate insulating layer to be left under the gate electrode, forming a dielectric layer for storage capacitance on the substrate, selectively doping impurities into a predetermined portion of the active layer, forming an interlevel insulating layer on the overall surface of the substrate, selectively removing the interlevel insulating layer and the dielectric layer to form a first contact hole which exposes the impurity-doped layer, forming source and drain electrodes connected to the impurity-doped layer through the first contact hole, forming a passivation layer on the overall surface of the substrate; selectively etching the passivation layer to form a second contact hole which exposes the drain electrode, and forming a pixel electrode connected to the drain electrode through the second contact hole.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

In a process for fabricating a TFT according to the present invention, a dielectric layer for a storage capacitor and a gate insulating layer are formed by different steps. Thus, the dielectric layer can be formed of a material having a larger dielectric constant, or formed thinner than the gate-insulating layer. Accordingly, it becomes possible to reduce the area occupied by the storage capacitor without sacrificing the capacitance, hence improving the aperture ratio of LCD. Furthermore, an interlayer insulating layer interposed between a storage electrode and a drain electrode can also be used for a second storage capacitor. The second storage capacitor is connected to the first storage capacitor in parallel so as to increase the total capacitance. This makes it possible to reduce the area occupied by the storage capacitor into roughly half, thereby drastically increasing the aperture ratio of LCD.

Figure 2A:
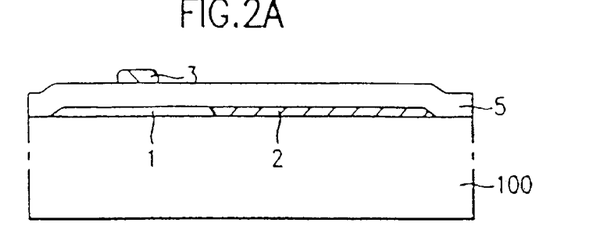
FIGS. 2A to 2E are cross-sectional views showing a method for fabricating a TFT for LCD according to a first embodiment of the present invention.

A method for fabricating a TFT according to a first embodiment of the present invention will be explained below with reference to FIGS. 2A to 2E. As shown in FIG. 2A, a. semiconductor layer is deposited on a transparent insulating substrate 100, and patterned to form an active layer 1. Impurities are doped into a predetermined portion of active layer 1 to form an impurity-doped semiconductor layer 2. Then, a gate insulating layer 5 is formed on the overall surface of the substrate including the active layer 1 and the impurity doped layer 2. A conductive layer, for example, a metal layer, doped polysilicon layer, or silicide layer, is formed on the gate insulating layer 5 and patterned to form a gate electrode 3.

Figure 2B:
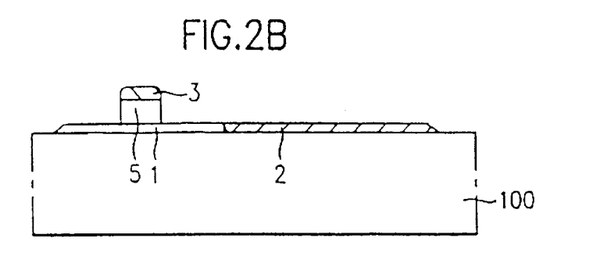
Figure 2C:
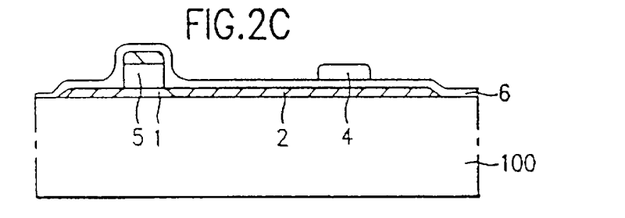

As shown in FIG. 2B, the gate insulating layer 5 is selectively etched using the gate electrode 3 as a mask. Then, as shown in FIG. 2C, a dielectric layer 6 is formed over the substrate. A conductive layer is deposited thereon and patterned to form a storage electrode 4. High-concentration impurities are doped into a predetermined portion of the active layer 1 to form source and drain regions, which are indicated by a new part of impurity-doped semiconductor layer 2 shown in FIG. 2C. Here, the dielectric layer 6 together with the impurity-doped semiconductor layer 2 and the storage electrode 4 constitutes a storage capacitor. Also, the dielectric layer 6 is formed of a material having a dielectric constant larger than that of gate insulating layer 5. This material, for example, includes SiNx, Ti oxide, Ta oxide, barium titanate oxide, and PZT oxide. Thus, the capacitance of the storage capacitor is increased.

Figure 2D:
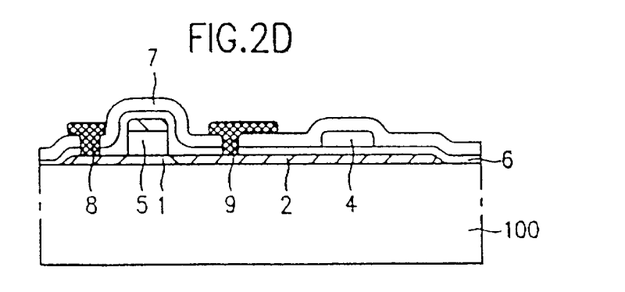

As shown in FIG. 2D, an interlayer insulating layer 7 is deposited on the overall surface of the substrate. The interlayer insulating layer 7 and the dielectric layer 6 are selectively etched to form contact holes which expose portions of impurity-doped semiconductor layer 2. Then, a conductive layer is deposited on the overall surface of the substrate and patterned to form source and drain electrodes 8 and 9 which contact the impurity-doped semiconductor layer 2 through the contact holes.

Figure 2E:
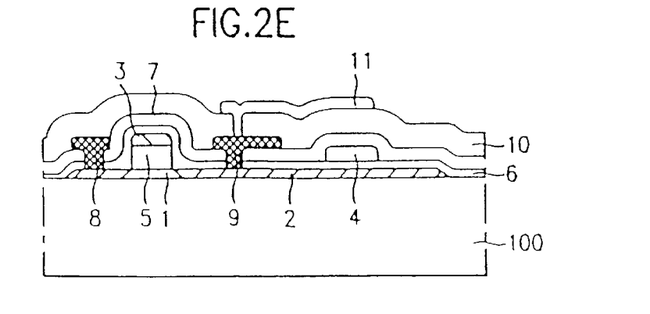

As shown in FIG. 2E, a passivation layer 10 is deposed on the overall surface of the substrate, and then selectively etched to form a contact hole which exposes the drain electrode 9. Then, a transparent conductive layer is formed over the substrate and patterned to form a pixel electrode 11. The pixel electrode 11 is connected to drain electrode 9 through the contact hole, thereby completing the fabrication of a TFT for TFT LCD having a storage capacitor.

Figure 3A:
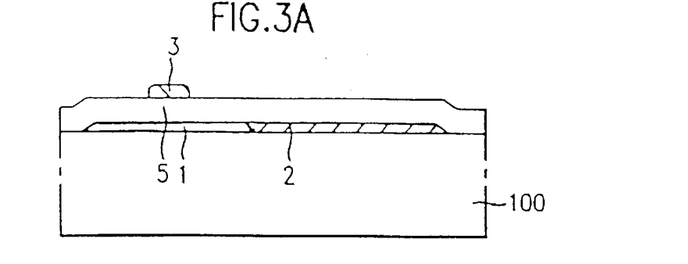
FIG. 3A to 3E are cross-sectional views showing a method for fabricating a TFT for LCD according to a second embodiment of the present invention.

A method for fabricating a TFT for LCD according to a second embodiment of the present invention will be explained below with reference to FIGS. 3A to 3E. As shown in FIG. 3A, a semiconductor layer is deposited on a transparent insulating substrate 100, and patterned to form an active layer 1. Impurities are doped into a predetermined portion of active layer 1 to form an impurity-doped semiconductor layer 2. Then, a gate insulating layer 5 is deposited on the overall surface of the substrate including the active layer 1 and the impurity-doped semiconductor layer 2. A conductive layer, for example, a doped polysilicon layer or silicide layer, is deposited on gate insulating layer 5, and patterned to form a gate electrode 3.

Figure 3B:
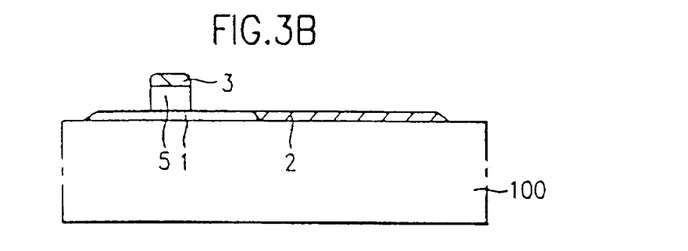
Figure 3C:
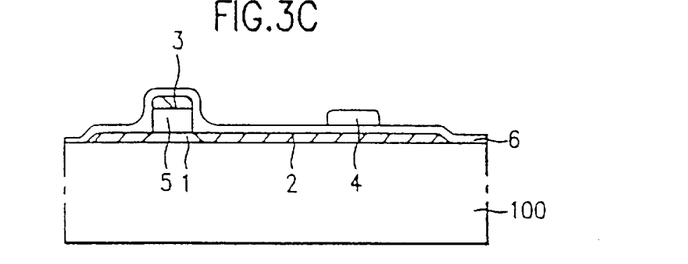

As shown in FIG. 3B, the gate insulating layer 5 is selectively etched using gate electrode 3 as a mask. Then, as shown in FIG. 3C, a dielectric layer 6 is deposited over the substrate. A conductive layer is formed thereon and patterned to form a storage electrode 4. High-concentration impurities are doped into a portion of the active layer 1 to form source and drain regions, which are indicated by a new portion of the impurity-doped semiconductor layer 2 shown in FIG. 3C. Here, the dielectric layer 6 together with the impurity-doped semiconductor layer 2 and the storage electrode 4 constitutes a first storage capacitor. The dielectric layer 6 is formed of a material having a dielectric constant larger than that of gate insulating layer 5. This material includes SiNx, Ti oxide, Ta oxide, barium titanate oxide, and PZT oxide. Thus, the capacitance of the storage capacitor is increased.

Figure 3D:
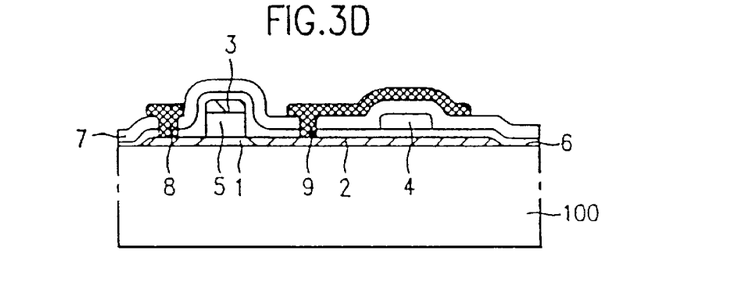

As shown in FIG. 3D, an interlayer insulating layer 7 is formed on the overall surface of the substrate. The interlayer insulating layer 7 and the dielectric layer 6 are selectively etched to form contact holes which expose portions of the impurity-doped semiconductor layer 2. Then, a conductive layer is formed on the overall surface of the substrate, and patterned to form source and drain electrodes 8 and 9, which are connected to the impurity-doped semiconductor layer 2 through the contact holes. Here, the drain electrode 9 is formed in such a way that it overlaps the storage electrode 4. Thus, the interlayer insulating layer 7 together with the drain electrode 9 and the storage electrode 4 constitutes a second storage capacitor. Moreover, this storage capacitor is connected to the first storage capacitor in parallel through the storage electrode 4. Thus, the total capacitance becomes roughly double, which makes it possible to reduce the area of the storage capacitance into roughly half without changing the capacitance.

Figure 3E:
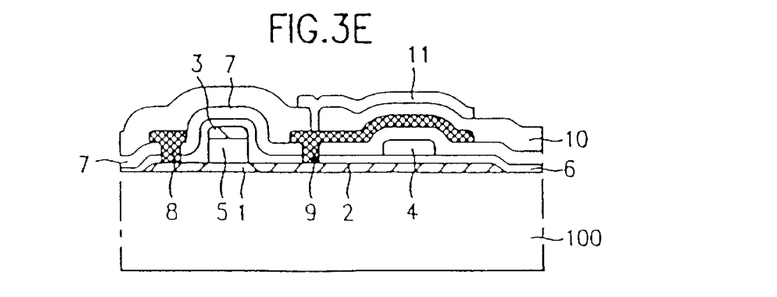

Thereafter, as shown in FIG. 3E, a passivation layer 10 is formed on the overall surface of the substrate, and selectively etched to form a contact hole which exposes a portion of drain electrode 9. Then, a transparent conductive layer is formed on the substrate, and patterned to form a pixel electrode 11. The pixel electrode 11 is connected to the drain electrode 9 through the contact hole, finishing fabrication of a thin film transistor having a storage capacitor.

Figure 4:
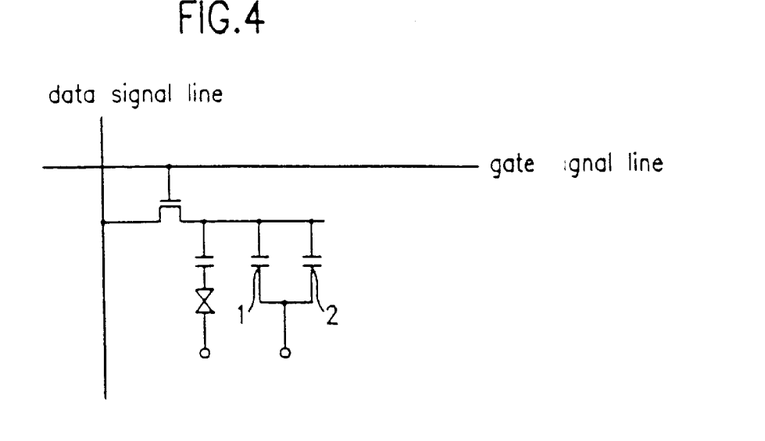
FIG. 4 is an equivalent circuit of a TFT according to the second embodiment of the present invention.
Figure 5:
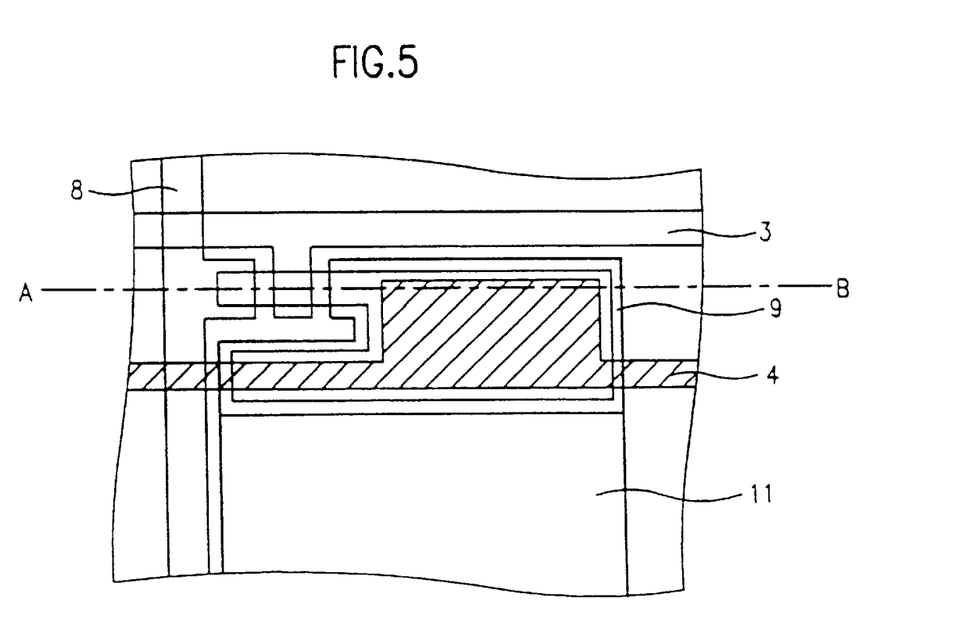
FIG. 5 is a plan view of a TFT according to the second embodiment of the present invention.

FIG. 4 is an equivalent circuit of TFT in FIG. 3E. This shows that the first and second storage capacitors A and B are connected in parallel to each other. FIG. 5 is a plan view of TFT in FIG. 3E. As shown in FIG. 5, drain electrode 9 overlaps storage electrode 4 so that the storage capacitance can be increased due to the parallel connection of the two storage capacitors, as described above.

Figure 6:
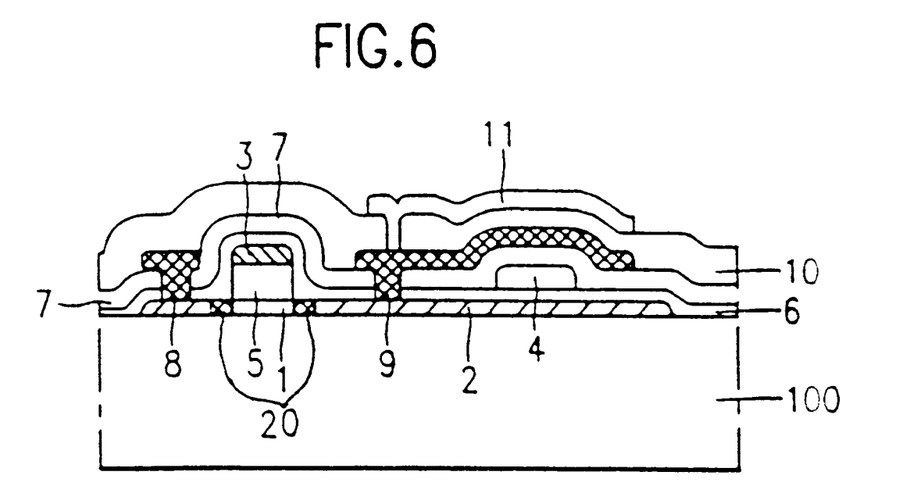
FIG. 6 is a cross-sectional view of a TFT for LCD according to a third embodiment of the present invention.

A TFT for LCD according to a third embodiment of the present invention will be explained below with-reference to FIG. 6. The TFT shown in FIG. 6 uses the parallel connection structure of the storage capacitors according to the second embodiment of the present invention, and employs a lightly doped drain (LDD) structure. In this case, an LDD region 20 (or an undoped offset region may be used) is formed on both sides of active layer 1. In the third embodiment, the same reference numerals designate similar parts as in the second embodiment.

Figure 7:
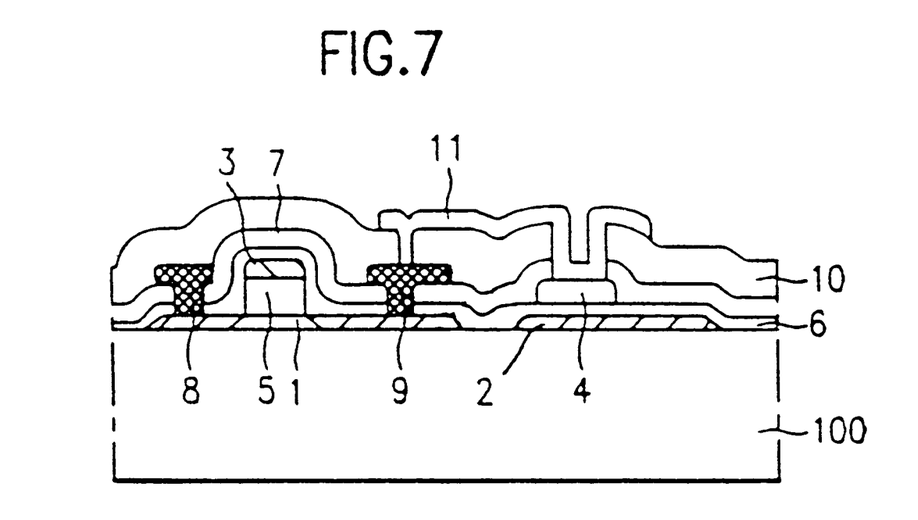
FIG. 7 is a cross-sectional view of a TFT for LCD according to a fourth embodiment of the present invention.

FIG. 7 is a cross-sectional view of a TFT for LCD according to a fourth embodiment of the present invention. In this case, the interlayer insulating layer 7 and passivation layer 10 placed above the storage electrode 4 are selectively removed to connect the storage electrode 4 to the pixel electrode 11. In the fourth embodiment, the same reference numerals are employed to designate similar parts as in the second embodiment of the present invention. In this embodiment, a portion of the impurity-doped semiconductor layer 2, which is located below the storage electrode 4, is electrically isolated from source and drain regions of the TFT. A method for fabricating the TFT according to the fourth embodiment of the present invention will be explained below.

After a passivation layer 10 shown in FIG. 2E is formed, the passivation layer 10 and interlayer insulating layer 7 are selectively etched to form contact holes which exposes drain electrode 9 and storage electrode 4. Then, a transparent conductive layer is formed over the substrate and patterned to form a pixel electrode 11, which contacts drain electrode 9 and storage electrode 4 through the contact holes.

Figure 8A:
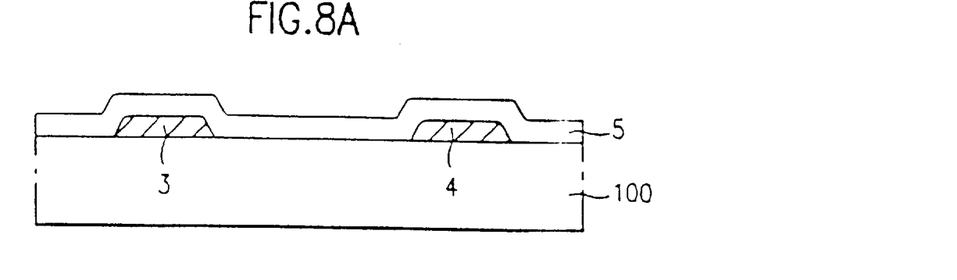
FIGS. 8A to 8D are cross-sectional views showing a method for fabricating a TFT according to a fifth embodiment of the present invention.
Figure 8B:
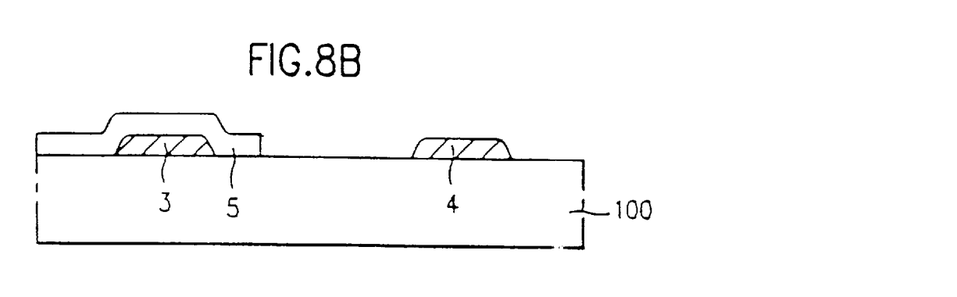

FIGS. 8A to 8D are cross-sectional views showing a method for fabricating a bottom gate-type TFT according to a fifth embodiment of the present invention. As shown in FIG. 8A, a conductive layer is deposited on a substrate 100 and patterned to form a gate electrode 3 and a storage electrode 4. Then, as shown in FIGS. 8A and 8B, an insulating layer is deposited on the substrate and selectively etched to form a gate insulating layer S on a predetermined portion of the substrate including the gate electrode 3.

Figure 8C:
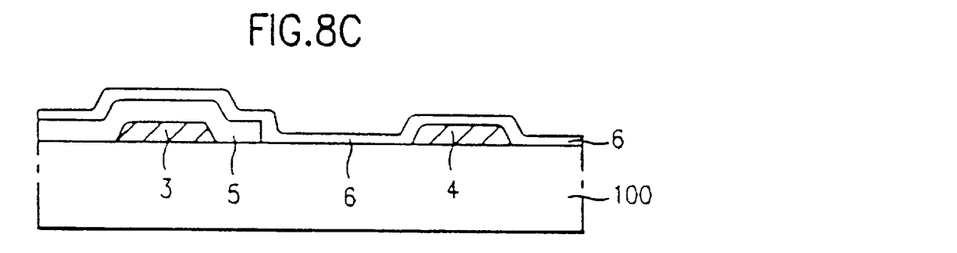
Figure 8D:
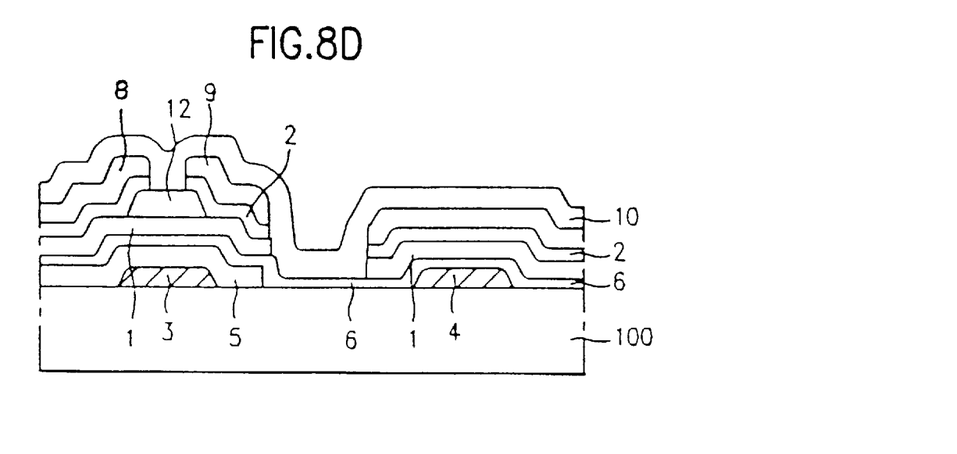

As shown in FIG. 8C, a dielectric layer 6 is formed on the substrate. The dielectric layer 6 is formed of a material having a large dielectric constant, for example, Ti oxide, Ta oxide, barium titanate oxide, or PZT oxide. Then, as shown in FIG. 8D, a semiconductor layer is deposited on dielectric layer 6 and patterned to form an active layer 1. Thereafter, an etch stopper 12 is formed only on a portion of the active layer 1 over the gate electrode 3, and then an impurity-doped semiconductor layer 2 is formed over the substrate. A conductive layer is deposited on the overall surface of the substrate and patterned to form source and drain electrodes 8 and 9. An exposed portion of the impurity-doped semiconductor layer 2 is selectively removed. Then, a passivation layer 10 is deposited on the overall surface of the substrate, thereby finishing the process.

According to the present invention, the gate insulating layer of the thin film transistor and the dielectric layer are formed by different steps. Accordingly, it is possible to form the dielectric layer of a material having a larger dielectric constant or to make the dielectric layer thinner as desired. Namely, the capacitance of the storage capacitor can be adjusted without affecting the gate insulating layer of a TFT. This makes it possible to decreases the area occupied by the storage capacitor without changing the capacitance. Thus, the aperture ratio of the LCD is improved.

Moreover, the interlayer insulating layer placed between the storage electrode and the drain electrode can be used as a second storage capacitor. The total capacitance can be increased by the parallel connection of the storage capacitors. Therefore, it becomes possible to further reduce the area occupied by the storage capacitor to about one-half. This further improves the aperture ratio.

Accordingly, the present invention provides a TFT-LCD device and a method for fabricating the same in which the storage capacitance is increased by reducing the thickness of a dielectric layer, forming the dielectric layer with a material having a larger dielectric constant, and/or connecting storage capacitors in parallel to reduce the area occupied by the storage capacitors without decreasing the storage capacitance value, thereby improving the aperture ratio of the TFT-LCD.

It will be apparent to those skilled in the art that various modifications and variations can be made in the liquid crystal display of the present invention without departing from the spirit or scope of the invention. Thus, it is intended that the present invention cover the modifications and variations of this invention provided they come within the scope of the appended claims and their equivalents.

What is claimed is:

1. A method for fabricating a liquid crystal display having a thin film transistor and a storage capacitor, the method comprising the steps of:

forming a semiconductor layer over a substrate;

forming a gate insulating layer over the substrate and the semiconductor layer;

forming a gate electrode over the gate insulating layer;

selectively etching an exposed portion of the gate insulating layer and leaving a portion of the gate insulating layer below the gate electrode;

forming a dielectric layer over the substrate, the active layer, and the gate electrode; and forming a storage electrode over the dielectric layer, wherein the dielectric layer is formed thinner than the gate insulating layer.

2. The method for fabricating a liquid crystal display according to claim 1 wherein the dielectric layer is formed of a material having a dielectric constant larger than that of the gate insulating layer.

3. The method for fabricating a liquid crystal display according to claim 1, wherein the dielectric layer is formed of one of SiNx, Ti oxide, Ta oxide, barium titanate oxide, and PZT oxide.

4. The method for fabricating a liquid crystal display according to claim 1, further comprising the steps of:

forming an interlayer insulating layer, having contact holes, on the dielectric layer, the contact holes exposing portions of the semiconductor layer;

forming source and drain electrodes on the insulating layer and contacting the semiconductor layer through the contact holes, respectively;

forming a passivation layer, having a contact hole, over the interlayer insulating layer and the source and drain electrodes, the contact hole exposing a portion of one of the source and drain electrodes; and forming a pixel electrode on the passivation layer and contacting the one of the source and drain electrodes through the contact hole.

5. The method for fabricating a liquid crystal display according to claim 4, further comprising the step of forming a second contact hole in the interlayer insulating layer to expose a portion of the storage electrode, the pixel electrode contacting the storage electrode through the second contact hole.

6. The method for fabricating a liquid crystal display according to claim 1, further comprising the step of forming a lightly doped drain region in the semiconductor layer at first and second sides of the gate electrode.

7. The method for fabricating a liquid crystal display according to claim 1, further comprising the step of forming an offset region in the semiconductor layer at first and second sides of the gate electrode.

8. A method for fabricating a liquid crystal display having a thin film transistor and a storage capacitor, the method comprising the steps of:

forming a semiconductor layer over a substrate;

forming a gate insulating layer over the substrate and the semiconductor layer;

forming a gate electrode over the gate insulating layer;

selectively etching an exposed portion of the gate insulating layer and leaving a portion of the gate insulating layer below the gate electrode;

forming a dielectric layer over the substrate, the active layer, and the gate electrode;

forming a storage electrode over the dielectric layer;

forming an interlayer insulating layer, having contact holes, on the dielectric layer, the contact holes exposing portions of the semiconductor layer;

forming source and drain electrodes on the insulating layer and contacting the semiconductor layer through the contact holes, respectively;

forming a passivation layer, having a contact hole, over the interlayer insulating layer and the source and drain electrodes, the contact hole exposing a portion of one of the source and drain electrodes; and forming a pixel electrode on the passivation layer and contacting the one of the source and drain electrodes through the contact hole, wherein the step of forming the drain electrode includes the step of extending the drain electrode over the storage electrode.

9. A method for fabricating a liquid crystal display including a thin film transistor and a storage capacitor, the method comprising the steps of:

forming an active layer over a substrate;

forming an impurity-doped semiconductor layer in a portion of the active layer;

forming a gate insulating layer over the substrate, the semiconductor layer, and the impurity-doped semiconductor layer;

forming a gate electrode over the gate insulating layer;

selectively etching an exposed portion of the gate insulating layer and leaving a portion of the gate insulating layer below the gate electrode;

forming a dielectric layer over the substrate, the impurity-doped semiconductor layer, the active layer, and the gate electrode;

forming a storage electrode on a portion of the dielectric layer;

selectively doping impurities into a portion of the active layer to form source and drain regions of the thin film transistor;

forming an interlayer insulating layer on the storage electrode, the dielectric layer, and the gate electrode;

selectively etching the interlayer insulating layer and the dielectric layer to form a first contact hole exposing a portion of the impurity-doped semiconductor layer;

forming source and drain electrodes connected to the source and drain regions of the impurity-doped semiconductor layer through the first contact hole, wherein the drain electrode is formed to overlap the storage electrode;

forming a passivation layer on a resultant surface of the substrate;

selectively etching the passivation layer to form a second contact hole exposing a portion of the drain electrode; and forming a pixel electrode contacting the drain electrode through the second contact hole, the pixel electrode overlapping the storage electrode.

10. A method for fabricating a liquid crystal display including a thin film transistor and a storage capacitor, the method comprising the steps of:

forming an active layer over a substrate;

forming an impurity-doped semiconductor layer in a portion of the active layer;

forming a gate insulating layer over the substrate, the semiconductor layer, and the impurity-doped semiconductor layer;

forming a gate electrode over the gate insulating layer;

selectively etching an exposed portion of the gate insulating layer and leaving a portion of the gate insulating layer below the gate electrode;

forming a dielectric layer over the substrate, the impurity-doped semiconductor layer, the active layer, and the gate electrode;

forming a storage electrode on a portion of the dielectric layer;

selectively doping impurities into a portion of the active layer to form source and drain regions of the thin film transistor;

forming an interlayer insulating layer on the storage electrode, the dielectric layer, and the gate electrode;

selectively etching the interlayer insulating layer and the dielectric layer to form a first contact hole exposing a portion of the impurity-doped semiconductor layer;

forming source and drain electrodes connected to the source and drain regions of the impurity-doped semiconductor layer through the first contact hole;

forming a passivation layer on a resultant surface of the substrate;

selectively etching the passivation layer to form a second contact hole exposing a portion of the drain electrode; and forming a pixel electrode contacting the drain electrode through the second contact hole, the pixel electrode overlapping the storage electrode, wherein the, dielectric layer is formed thinner than the gate insulating layer.

11. The method for fabricating a liquid crystal display according to claim 10 wherein the dielectric layer is formed of a material having a dielectric constant larger than that of the gate insulating layer.

12. The method for fabricating a liquid crystal display according to claim 9, wherein the dielectric layer is formed of one of SiNx, Ti oxide, Ta oxide, barium titanate oxide, and PZT oxide.

13. A method for fabricating a liquid crystal display having a thin film transistor and a storage capacitor, the method comprising the steps of:

forming a semiconductor layer over a substrate;

forming a gate insulating layer over the substrate and the semiconductor layer;

forming a gate electrode over the gate insulating layer;

selectively etching an exposed portion of the gate insulating layer and leaving a portion of the gate insulating layer below the gate electrode;

forming a dielectric layer over the substrate, the active layer, and the gate electrode; and forming a storage electrode over the dielectric layer, wherein the dielectric layer is formed of one of Ti oxide, Ta oxide, barium titanate oxide, and PZT oxide and the dielectric layer is formed thinner than the gate insulating layer.

14. The method for fabricating a liquid crystal display according to claim 13, wherein the dielectric layer is formed of a material having a dielectric constant larger than that of the gate insulating layer.

15. The method for fabricating a liquid crystal display according to claim 13, further comprising the steps of:

forming an interlayer insulating layer, having contact holes, on the dielectric layer, the contact holes exposing portions of the semiconductor layer;

forming source and drain electrodes on the insulating layer and contacting the semiconductor layer through the contact holes, respectively;

forming a passivation layer, having a contact hole, over the interlayer insulating layer and the source and drain electrodes, the contact hole exposing a portion of one of the source and drain electrodes; and forming a pixel electrode on the passivation layer and contacting the one of the source and drain electrodes through the contact hole.

16. The method for fabricating a liquid crystal display according to claim 15, wherein the step of forming the drain electrode includes the step of extending the drain electrode over the storage electrode.

17. The method for fabricating a liquid crystal display according to claim 15, further comprising the step of forming a second contact hole in the interlayer insulating layer to expose a portion of the storage electrode, the pixel electrode contacting the storage electrode through the second contact hole.

18. The method for fabricating a liquid crystal display according to claim 13, further comprising the step of forming a lightly doped drain region in the semiconductor layer at first and second sides of the gate electrode.

19. The method for fabricating a liquid crystal display according to claim 13, further comprising the step of forming an offset region in the semiconductor layer at first and second sides of the gate electrode.

* * * * *